United States Patent [19]
Taylor, III et al.

[11] Patent Number: 5,867,633
[45] Date of Patent: Feb. 2, 1999

[54] METHOD AND APPARATUS FOR PROCESSING AND PRINTING DOCUMENTS

[75] Inventors: Robert B. Taylor, III, Vancouver, Wash.; Kirt Alan Winter, Escondido, Calif.; Robert Chou; Sachin Naik, both of San Diego, Calif.

[73] Assignee: Hewlett-Packard Company, Palo Alto, Calif.

[21] Appl. No.: 767,126

[22] Filed: Dec. 9, 1996

[51] Int. Cl.$^6$ .............................. G06F 3/12; G06F 9/00; G06F 15/16; G06F 13/00
[52] U.S. Cl. .......................... 395/109; 395/114; 395/827; 395/674; 395/675; 395/681
[58] Field of Search ..................... 395/114, 109, 395/110, 112, 200.31, 200.33, 200.56, 200.58, 825, 826, 827; 359/830, 831, 836, 828, 674, 670, 681

[56] References Cited

U.S. PATENT DOCUMENTS

| | | | |
|---|---|---|---|
| 5,220,674 | 6/1993 | Morgan et al. | 395/114 |
| 5,303,336 | 4/1994 | Kageyama et al. | 395/114 |
| 5,493,408 | 2/1996 | Kurogane et al. | 395/114 |
| 5,559,933 | 9/1996 | Boswell | 395/114 |
| 5,579,087 | 11/1996 | Salgado . | |
| 5,580,177 | 12/1996 | Gase et al. | 395/114 |
| 5,583,949 | 12/1996 | Smith et al. . | |
| 5,586,241 | 12/1996 | Bauermeister et al. . | |
| 5,617,518 | 4/1997 | Kuwamoto et al. | 395/114 |
| 5,619,649 | 4/1997 | Kovnat et al. | 395/114 |
| 5,699,495 | 12/1997 | Snipp | 395/114 |

*Primary Examiner*—Scott Rogers

[57] ABSTRACT

The present invention relates to a method and system for efficient image handling. The invention includes an image server with which image files are registered. The image processing requests are sent to the image server to produce image data representing the processed image file. In one embodiment of the invention, a document processing application obtains an image file for printing. The application registers the image with the image server. The image server returns an identifier identifying the image file which is used for subsequent image processing requests. The application initiates a print job, sending the image identifier and selected print parameters to a printer driver. In response, the printer driver negotiates image processing requests with the image server to modify the image file in accordance with the selected print parameters. Finally, the processed image data is retrieved from the image server and sent to the printer. The image server and printer driver may be separate and independently executing processes. In an alternate embodiment, the application, image server and printer driver are loaded on two or more networked computers.

20 Claims, 3 Drawing Sheets

5,867,633

METHOD AND APPARATUS FOR PROCESSING AND PRINTING DOCUMENTS

TECHNICAL FIELD

The present invention relates generally to processing documents and more specifically to a method and system for preparing documents for printing.

BACKGROUND ART

Image processing has become a commonplace activity due to the ease and availability of the hardware and software used to capture images. The popularity and accessibility of the Internet, and more importantly the creation of the World Wide Web, have greatly increased the use of images. However, the processing of captured images and other graphical elements is generally more complex as compared to the processing of textual data. For example, color images may need to be color matched between a video display and a printer, edge enhanced to extract certain features, and so on. Such manipulations tend to be CPU intensive, and because of the large amounts of data typically associated with image files, especially color images, such manipulations also tend to be I/O intensive. One area that is affected by the increased use of images, for example, is the preparation and printing of documents containing such images.

Because of the availability of sophisticated word processing and other desktop publishing programs, documents generally no longer consist solely of text data, but rather include a variety of images. Preparing such documents for printing on a computer may require several image processing operations including scaling, clipping, sharpening, various transformations and the like. These operations are performed either by the application or by printer driver software normally included with the printer. As a consequence of incorporating images into a document, the computer system will experience a high degree of loading due to the processing of the large amounts of data, typical of graphical image elements. Several approaches to document preparation and printing exist.

Some applications prepare a device independent bitmap of an image of the document to be printed. The bitmap is then sent to a printer via its corresponding printer driver software. In most cases, the application has no knowledge of the printer's requirements. For example, a user may decide to print a medium quality image using a certain kind of paper. This requires that an image of the document be created with a certain resolution and bit depth. The application cannot determine the resolution and/or bit depth needed to render output in accordance with the print parameters selected by the user. Such knowledge is contained in the printer driver. The application, having to accommodate any kind of printer, therefore takes a conservative approach and sends a copy of a high resolution bitmap of the image to the printer driver. The printer driver then performs additional processing (e.g. decimation) on the received copy of the high resolution image to generate output for the printer at the appropriate resolution.

This simple approach is a very inefficient way of printing. The application always generates a high resolution copy of the document regardless of the printer and the selected print parameters. This translates to the unnecessary processing of large amounts of data, requiring excessive disk activity as intermediate files are created, written out to the disk, read in from the disk, processed, written back out to the disk and so on. Such activity adversely impacts the user since access to the CPU is blocked until the print job has completed.

In another approach, the document processing application queries the printer driver to determine what image processing capabilities exist in the printer driver. The application then decides how to divide up the image processing tasks between the application and the printer driver. The application produces an appropriate image of the document and sends a copy of the image to the printer driver. The printer driver performs any required additional processing on the copy of the received image and outputs a final printer image of the document to the printer. Knowing the image processing capabilities of the printer driver improves efficiency, since printer-specific processing such as output resolution generation is performed by the printer driver. The application no longer needs to generate a high resolution bitmap in an attempt to accommodate all printers. Rather, the application performs only device-independent operations such as clipping, red-eye correction, sharpening, etc., operations not typically supported by the printer driver. This results in a smaller image file that is then passed from the application to the driver. From the standpoint of the user, however, the CPU still is tied up until the application has processed the image and passed a copy of the image to the printer driver, at which point the printer driver performs additional printer-specific processing on the received copy of the image and outputs the generated printer image to the printer.

To alleviate the waiting, most computers use a technique known as spooling to return the CPU to the user as quickly as possible from a print job. The printer image, i.e. the bitmap image that is actually sent to the printer, is copied out to the disk and sent to the printer as a background process. This allows the printer driver to return control of the computer back to the user without having to wait for the actual output to be produced. However, transmitting the final printer image to the printer quite often represents only a small fraction of the total effort of the print job, most of the effort and time being expended both by the application and the printer driver to produce the printer image of the document in the first place.

One operating system has taken the spooling technique one step further. Under the Microsoft® Windows '95 operating system, a method known as enhanced metafile format (EMF) spooling was implemented. With EMF spooling, the operating system (OS) spools up all of the calls that the application makes to the printer driver to a spool file, much in the same way that a printer image is presently spooled. The OS then plays back the spooled file, sending the spooled information to the printer driver, thus completing the print job entirely in the background. Control of the computer is returned to the user sooner under EMF spooling, since the user no longer must wait for the printer driver to perform its image processing operations.

Yet, even with EMF spooling, there still are factors which impact system performance during printing. Most notably is the fact that large amounts of data are being passed through the system. For example, consider a 24-bit color digitized image of an 8"×10" photograph. Roughly 20 megabytes of data are needed to represent such an image at 300 dpi and 80 megabytes of data at 600 dpi. With EMF spooling, the OS spools up the calls made to the printer driver from the application, along with a copy of the 20 or 80 megabytes of data that represent the image. The spooled file is written to disk. During playback, the spooled file (which includes the 20 megabytes of image data) is read back from the disk and handed to the printer driver. As the printer driver prepares the printer image, temporary files are created, stored on the disk, read from the disk, written back out to the disk and so on. All of this disk activity takes its toll in the response time and overall performance of the OS. What the user perceives is a very slow and otherwise non-responsive system.

While the foregoing discussion has focused on the bottlenecks experienced during the processing of a print job, similar bottlenecks exist in the processing of images in general. What is needed is a method and system which minimizes the amount of data being passed by the OS during the handling and processing of images. In particular, a method and system is needed to more efficiently process a print job. It is also desirous to minimize the disk activity experienced by the OS during the processing of an image, such as during a print job.

SUMMARY OF THE INVENTION

In accordance with the present invention, processing an image to produce a desired appearance of the image begins by registering the image with an image server. The image server returns a handle, identifying the image within the image server. Image processing requests then are sent to the image server in accordance with the desired appearance of the image. The processed image is then retrieved from the image server.

In one embodiment, a method and system for printing a document includes registering the document with an image server and subsequently receiving from the image server an identifier identifying the document. The document to be printed is registered with the image server by passing to the image server a file descriptor which identifies the location of the document. The file descriptor typically is the filename of the document located on disk, but may be a pointer to a location in shared memory where the document is stored. Continuing, the identifier is passed to a printer driver, along with print parameters describing the desired appearance of the printed document. Using the identifier to reference the document, the printer driver sends image processing requests to the image server, directing the latter to form a printer image by processing an image of the document in accordance with the print parameters. Finally, the printer driver retrieves the printer image from the image server, which consists only of the image data of the processed document needed for downloading to a printer.

The amount of data being passed through the system during printing is kept to a minimum. For example, rather than copying large volumes of data representing the document from the address space of one process into the address space of another process, an identifier is used instead. The identifier serves to identify the document, and because it is an identifier of the document and not the document itself the amount of data passed is significantly less.

Another feature of the present invention is that only those portions of the image that are needed to form the final printer image are accessed by the image server. In this way, the amount of handling of the images contained in a document is minimized. The result is lower disk activity for saving and loading data to and from the disk during the formation of the printer image. In addition, the load on the CPU is less. This has the overall effect of providing a quicker turnaround time for the user issuing a print command and improving system performance.

In a preferred embodiment of the present invention, the user application which initiates the print jobs executes separately from and independently of both the image server and the printer driver. Similarly, the image server and the printer driver may be separate, concurrent and independently executing processes, if the OS supports multi-tasking operation. When the image server receives a request from an application (e.g. a word processing application) to register a document, the image server will lock the document to prevent other processes from accessing the document. This ensures the integrity of the document during the time the image server produces the desired printer image. Nevertheless, upon receiving a subsequent unlock request, the image server can make a temporary copy of the document and unlock the original. Since the document is referenced by way of the identifier originally provided by the image server, processes outside of the image server are unaffected by the copying.

In a variation of the preferred embodiment, two or more applications are loaded, each selecting a document to be printed and each issuing a print job in accordance with the present invention. Similarly, two or more printer drivers may be loaded and executed as separate program units. In this way, more than one kind of printer can be supported. Each such printer driver is written or otherwise configured with the ability to communicate with its corresponding printer.

In yet another variation of the preferred embodiment, the image server and printer driver(s) may reside on two or more networked computers. The application(s) can be co-located with the image server or printer driver(s), or located on separate computers. This provides maximum flexibility in configuring a site having multiple workstations configured around a file server and one or more printers, while at the same time realizing the performance benefits made possible by the present invention.

BEST MODE FOR CARRYING OUT THE INVENTION

Figure 1:
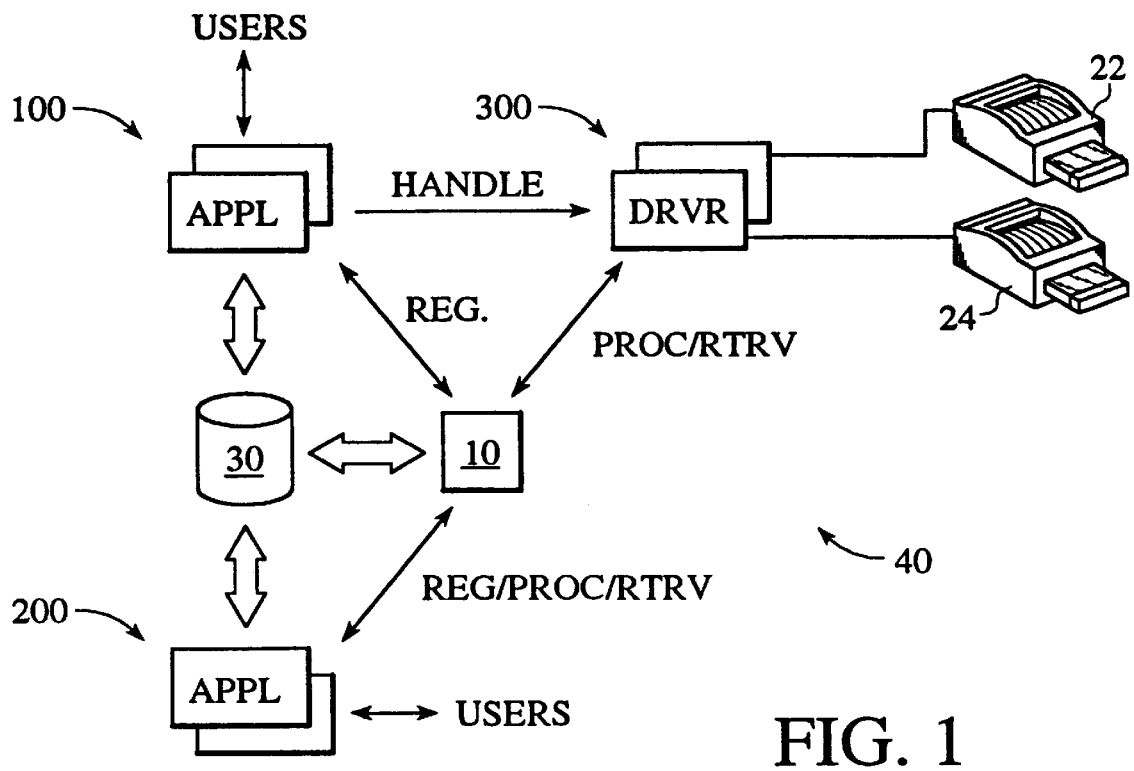
FIG. 1 is a system diagram of an embodiment of the present invention.

The best mode contemplated for practicing the present invention is depicted in the system block diagram shown in FIG. 1. In a computer system 40, one or more user applications 100, 200 generate and manipulate documents through interactions with users. Such applications include word processing programs, drawing programs, spreadsheet programs, document assembly programs, photographic imaging programs and the like. The term "users" is herein defined as either a human user interacting with the application, or an automated agent which interacts with the application; e.g. software which emulates a fax machine automatically receiving incoming faxes, image scanning software, automated data retrieval software, etc. The applications 100, 200 have access to a data store 30 for storing and retrieving data as needed. The data store 30 further includes areas within the address space of the application's random access memory (RAM), and may refer to different areas within shared memory.

An image processing server 10 provides image processing capability for manipulating image-containing documents. The applications 100, 200 communicate with the image server 10 by way of an image server interface, which is described in greater detail below. Like the applications, the image server 10 has access to the data store 30.

Some of the applications 100 are shown in communication with printer drivers 300, to which printing devices 22, 24 are connected. Each of the printer drivers 300 is written specifically for a particular type and/or kind of printer device. For example, the printer device 22 may be a plotter, while the printer device 24 is a laser printer. Alternatively, both printer devices 22, 24 may be inkjet printers, but from different manufacturers and each requiring a driver which can communicate with the device.

An aspect of the invention is and the printer drivers 300 may be loaded as independently executing program units; i.e. each is a separate process. Communications among the processes are provided through well known and fully understood interprocess communication (IPC) techniques, such as RPC OLE and COM. Most operating systems (OS) support at least some form of multitasking and also provide for IPC among processes. Typical OS's include: the many incarnations of the UNIX OS; the Macintosh OS; Windows 3.x; Windows '95 and Microsoft NT. This list, of course, is merely exemplary and not intended to be limiting. The present invention can be effectively implemented on other multitasking systems which support IPC.

Figure 2:
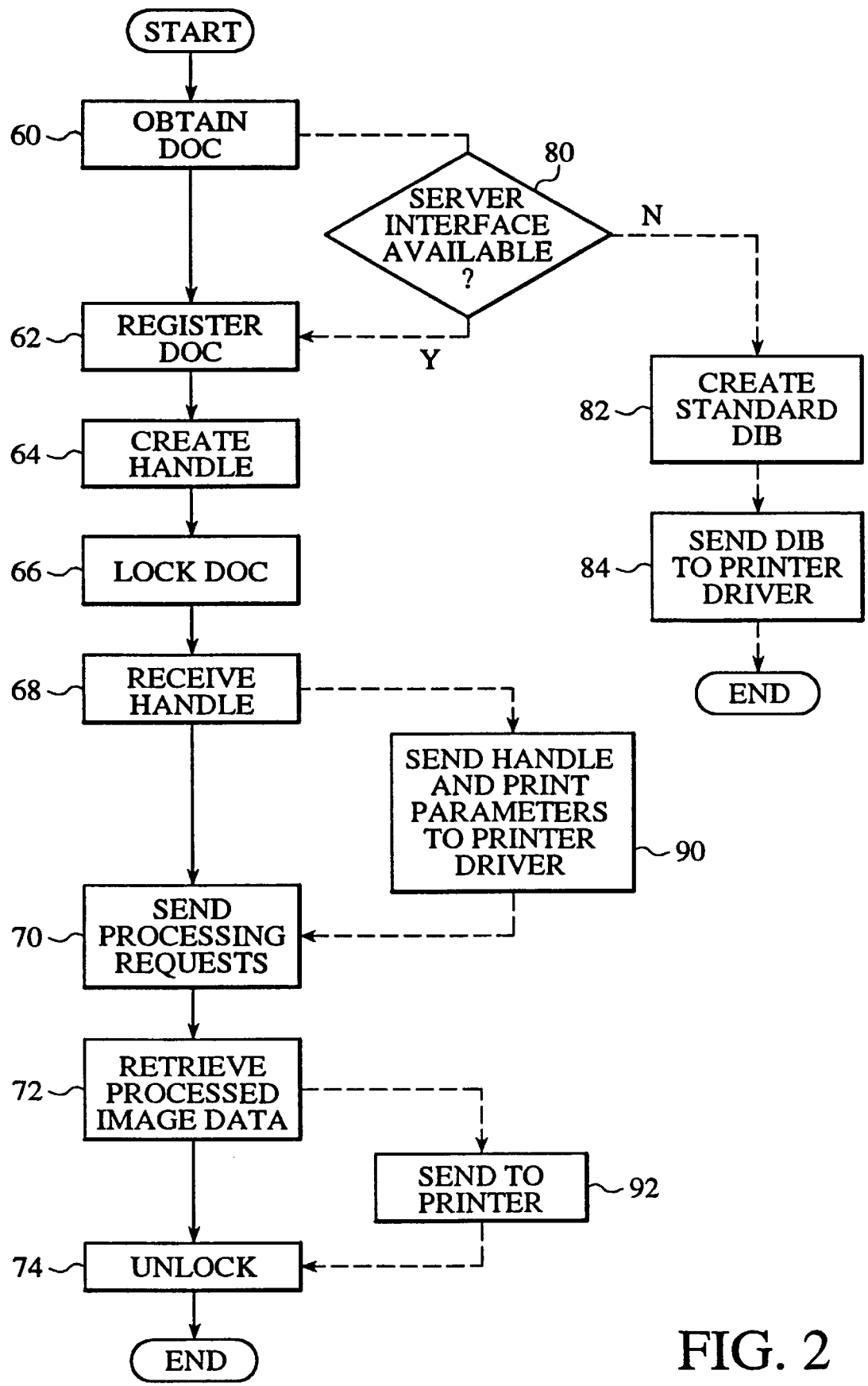
FIG. 2 illustrates a typical sequence of events when processing documents in accordance with the present invention.

The flowchart shown in FIG. 2 illustrates the steps typically performed when printing images and documents in accordance with the present invention. The sequence shown in FIG. 2 corresponds to the applications 100 and printer drivers 300 shown in FIG. 1. First, a document is obtained by an application 100, either by reading in a file from the data store 30 and/or from input provided by a user of the application, step 60. The document is identified by the name of the file on disk, or by an address pointer in memory where the document is stored. In addition to obtaining the document, the application 100 obtains from the user print parameters describing the desired appearance of the printed document.

Continuing, the application 100 registers the document with the image server 10 by sending its file name, or its address pointer, to the image server, step 62. Recall that the applications 100, 200 and the image server 10 may be independently executing processes. Each process therefore may have its own logical address space, which generally is not directly accessible by other processes. Thus, if an application registers a document by way of an address pointer, the document must reside in a shared memory region which can be accessed by two or more processes. Similarly, an address pointer may be used when the data exists in one address space, as in the case with dynamically linked libraries.

Upon receiving the document identifier, the image server 10 creates a handle which identifies the document independently of the identifier provided by the application 100, step 64. Although the term "handle" typically implies certain data structures, the references to "handle" in this application are not intended to be limited to such data structures. Rather, any implementation of a "handle" consistent with the description given in this application is contemplated. Continuing, the image server then locks the document to prevent access to it by other applications, step 66. The document handle and document locking mechanisms ensure the integrity and consistency of the document while it is being processed by the image server. For example, if a second application attempts to modify the document, it must first send an unlock request to the image server. The image server may respond by making a local copy of the document and unlocking the original. The image server subsequently references the local copy, and relinquishes the original document so that the second application may access it.

Continuing, the application 100 receives the handle created by the image server and sends it and the specified print parameters to the printer driver 300, steps 68 and 90. The printer driver 300 then sends one or more image processing requests to the image server 10 to process the image identified by the handle in accordance with the print parameters, step 70. Next, the printer driver retrieves the processed image data from the image server, step 72, and sends the retrieved image data to the corresponding printer 22, 24, step 92. Finally, the document is unlocked, step 74.

If the image server creates a local copy of the document as described above, image processing requests will be directed to the local copy. The fact of the copying is completely transparent to the printer driver, since it uses the document handle to refer to the document. Upon completion of the print job, the image server will delete the local copy.

Generally, the image server 10 provides the bulk of the image processing operations in the present invention. However, it may be desirable to limit the processing capability of the image server to those generic operations which are independent of any kind or type of printer. Any printer specific image requirements can be performed by the printer driver upon retrieving the image data in step 72 to form a final printer image which is then sent to the printer.

FIG. 2 includes additional steps 80 through 84, which address the issue of backward compatibility. Prior to registering the document with the image server 10, the application 100 first queries the printer driver to determine whether it has an interface to the image server, step 80. If the response is negative, the application proceeds along the lines of the prior art printing methods. Typically, this means the application produces a device independent bitmap (DIB) image of the document to be printed and sends the DIB image to the printer driver for subsequent printing, steps 82 and 84. However, if the printer driver supports an image server interface, then the application continues along steps 62 through 92 as described above.

In another embodiment, also depicted in FIG. 2, the method of the present invention includes only those steps identified by the reference numerals 60 through 72. This sequence corresponds to the applications 200 shown in FIG. 1. This alternate embodiment is a generalization of the present invention, of which the above-described printing process is a special case. In the generalized method, the application 200 itself communicates with the image server to effectuate desired image processing operations on the document, step 70. In addition, the resulting processed image data is not necessarily printed, but rather may simply be stored onto the data store 30, or displayed on a video terminal.

The discussion will now turn to the components of the present invention. Numerous software modules comprise most of the major components of the system. As such, many existing programming languages can be used to practice the invention; most notably the C and C++ languages. The functions of the software modules are defined in terms of the applications programmer interface (API) for each module, the specific implementation details simply being a matter of producing the code to perform the operations required to implement the API. In some cases, however, it may be necessary to explain the operation in terms of an actual OS. In order to provide the needed context in those cases, the Windows '95 operating system environment will be used.

Figure 3:
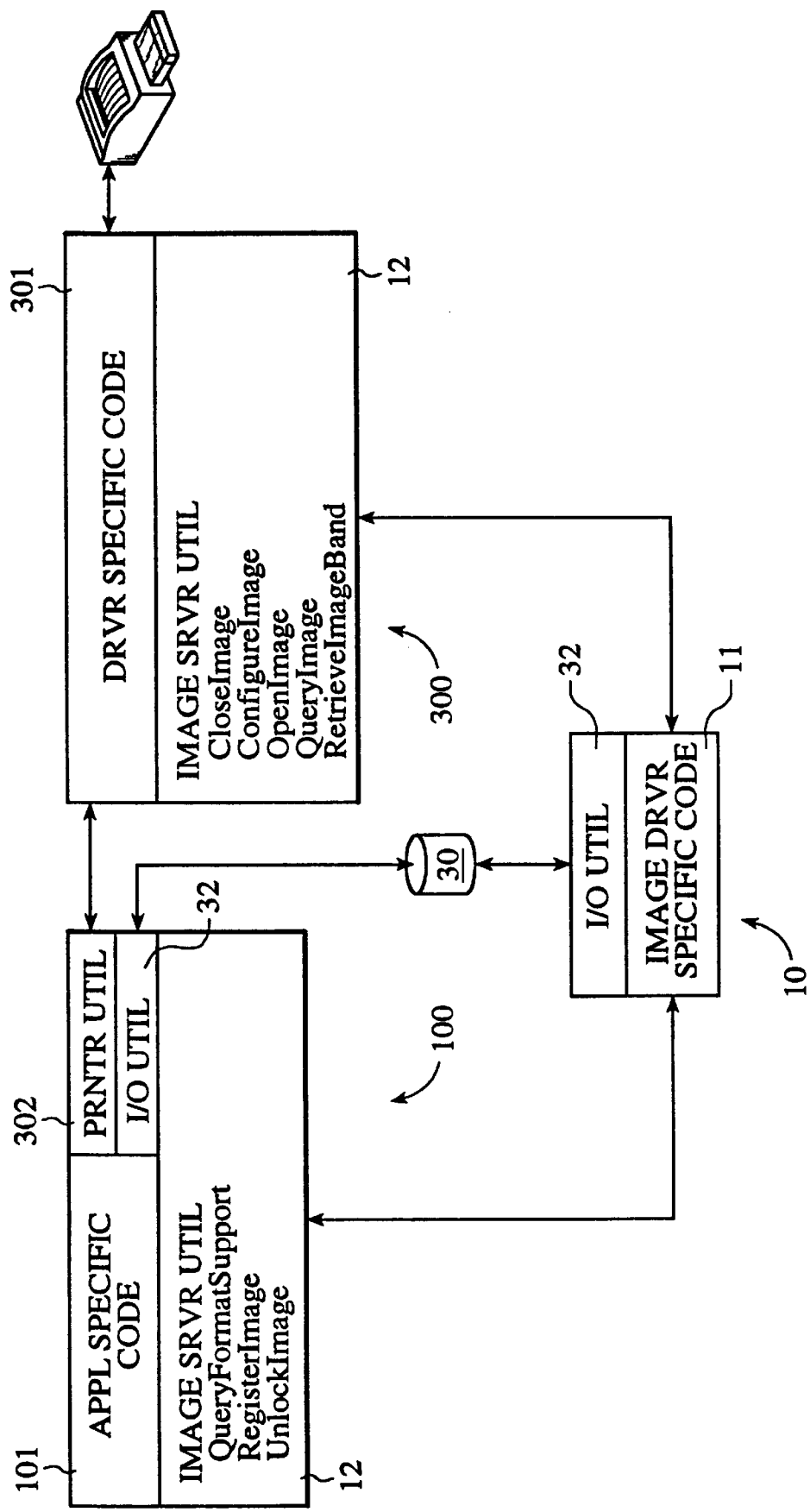
FIG. 3 shows the interfaces between the software components of the system of the present invention.

Referring to FIG. 3, the application 100 typically includes the following components: application specific code 101; printer utilities 302 for communicating with the printer driver 300; I/O utilities 32 for reading and writing a memory store 30; and image server utilities 12 for communicating with the image server 10. The application specific code 101, of course, varies depending upon the application. As mentioned above, various types of applications are contemplated, including word processing, drawing programs, spreadsheets, desktop publishing programs and so on.

The printer drivers 300 include driver specific code 301 for communicating with printing devices, and further include the image server utilities for communicating with the image server. In addition to providing a communication interface to the printing device, the driver specific code 301 may perform certain image processing operations specific to the printer. In this way, the image server 10 needs to provide only those image processing operations that are device independent.

The image server 10 includes the I/O utilities 32 and image server specific code 11 which implements image processing operations such as resolution scaling, image enlargement/reduction, clipping, red-eye correction, rotations, feature extraction, edge enhancement and so on. Such operations are known and understood by those of ordinary skill in the computer imaging and computer graphics arts. The image server can be designed to support one or more of the many types of image formats that exist in the industry, including but not limited to JPEG, MPEG, GIF, TIFF, etc. It is noted that the specific formats supported by the image server are not critical to the practice of the present invention. Rather, the choice of format(s) will depend on weighing certain factors such as desired capability of the image server, complexity of the code, complexity of the image formats, processing capacity, storage requirements, operating environment, system cost, etc.

The I/O utilities 32 perform standard operations, including: open a file, close a file, read from a file and write to a file. Such operations are fully understood by those skilled in the software arts and therefore require no further elaboration.

The printer utilities 302 enable the application 100 to communicate with the printer driver 300 to initiate a print job. Included in the printer utilities is a function which enables the application 100 to determine whether the printer driver 300 supports an image server interface, see step 80 in FIG. 2. Under Windows '95, for example, this may be accomplished by making a system call to ExtEscape() for the IS_SUPPORT code (image server support). A printer driver 300 which supports the image server 10 will recognize the IS_SUPPORT code and respond affirmatively. Consequently, the return value from the call to ExtEscape (QUERYESCSUPPORT, IS_SUPPORT) will be positive. Otherwise, the return value will be 0 (zero), indicating that the image server is not supported.

If the image server is not supported, the application will continue processing in the manner presently done in the prior art. Namely, the application will generate a DIB image and send the image to the printer driver 300, which under Windows '95 is done by making a system call to StretchDIBits() and passing a pointer to the DIB image. On the other hand, if the printer driver supports the image server, the application will obtain a handle to the image (see below, see also step 68 of FIG. 2) and make the system call to StretchDIBits(), passing the handle instead of the DIB image.

The image server utilities 12 define the interface to the image server. Thus, image processing operations are effectuated by making the appropriate calls to the utilities. The application programmer's interfaces (API's) for the image server utilities will be discussed below. These API's define the functionality of the image server and thus obviate the need to provide examples of the source code that implements the image server, which will depend on the OS and the programming language used. It is understood that a person of ordinary skill in the programming arts can produce the code which implements the functions defined by the API.

As mentioned above, the image server 10 is capable of supporting a variety of image formats. Since the image server is accessed through the image server utilities 12, the image server can be easily extended to support additional image formats as new formats are defined. The presence of the image server utilities 12 makes this extension completely transparent to applications/drivers which use the image server, thus maintaining backward compatibility when the image server is upgraded to support new image formats.

FIG. 3 shows the API definitions for the image server utilities 12. The figure shows the utilities are divided between the application 100 and the printer driver 300. This is not necessarily the case, however. Depending on the particular use, all of the listed utilities may reside within one application, or may be divided among a number of applications. In alphabetical order, the API's are:

CloseImage
Function:
  Informs the image server that processing of the image file is complete. The image server will unlock the image file to allow access to the file by others.
Parameters:
  ihImageHandle—Identifies the image file.
Returns:
  TRUE—Function was successful.
  ISE_NOTREGISTERED—ihImageHandle does not map to a currently registered image file.
ConfigureImage
Function:
  Informs the image server of the image processing operations (formatting options) to be performed on the image.
Parameters:
  ihImageHandle—Identifies the image file to be processed.
  ipImageProcOptions—A data structure which contains the requested image processing options.
Returns:
TRUE—Function was successful.
ISE_FORMAT_NOTSUPPORTED—Specified format is not supported by the image server.
  ISE_NOTREGISTERED—ihImageHandle does not map to a currently registered image file.
OpenImage
Function:
  Informs the image server that image processing operations are to be performed on the specified image (via calls to ConfigureImage()).
Parameters:
  ihImageHandle—Identifies the image file.
Returns:
  TRUE—Function was successful. Image server is ready to accept image processing requests for ihImageHandle.
  ISE_NOTREGISTERED—ihImageHandle does not map to a currently registered image file.

QueryFormatSupport
Function:
    Queries the image server as to whether the image server supports the specified image format. Information may be provided indicating additional processing capability supported by the image server for the specified image format.
Parameters:
    dwImageFormat—The specified image format of interest. For example, TIFF, JPEG, MPEG, GIF.
    lpFormatData—Pointer to a data structure indicating additional processing capability, e.g. compositing, provided by the image server.
Returns:
    ISE_FORMAT_SUPPORTED—Specified format is supported by the image server. If lpFormatData is not the NULL pointer, then additional formatting features may be specified therein by the image server.
    ISE_FORMAT_NOTSUPPORTED—Specified format is not supported by the image server.
QueryImage
Function:
    Provides information about the specified image file.
Parameters:
    ihImageHandle—Identifies the image file for which information is desired.
    lpImageInfo—Pointer to image information data structure. Filled in by the image server.
Returns:
    TRUE—Function was successful.
    ISE_NOTREGISTERED—ihImageHandle does not map to a currently registered image file.
RegisterImage
Function:
    Locks and/or copies the specified image file and returns a private handle to the locked/copied image file. The handle is used for subsequent access to the file.
Parameters:
    lpszImageFileName—Points to a fully qualified path/file name of the image file. Alternatively, the image file may be passed by a pointer to a buffer, in which case, lpszImageFileName is the NULL pointer.
    lpJobData—Points to a structure containing pertinent job data, such as the name of the print device.
    dwImageFormat—Specifies the image format of the specified image file.
    lpImageHandle—Points to a buffer into which the image handle (generated by the image server) will be copied.
    lpImageData—Points to a buffer containing the image file. Alternatively, the image file may be referenced by a fully qualified path/file name, in which case lpImageData is the NULL pointer.
    lpImageDataHeader—Points to a data structure which defines the format of the data pointed to by lpImageData.
    This is the NULL pointer if lpImageData is also the NULL pointer.
    dwOptions—Specifies how the image is file is registered with the image server. Valid values include:
        IS_TEMPFILE—The file pointed to by lpszImageFileName is a temporary file that is to be deleted by the image server when a call to CloseImage is made.
        IS_COPYNOW—The file pointed to by lpszImageFileName is a not temporary file, but the image server should make a copy of the image file rather than locking the file.
Returns:
    TRUE—Function was successful. lpImageHandle points to a valid handle (created by the image server) for the image.
    ISE_OUTOFSPACE—Could not make requested copy of image file. lpImageHandle contents are undefined.
    ISE_FORMNOTSUPP—Format specified in dwImageFormat not supported by this version of the image server. lpImageHandle contents are undefined.
RetrieveImageBand
Function:
    Requests the image data of the processed image, generated by the image server as a result of preceding call(s) to ConfigureImage().
Parameters:
    ihImageHandle—Identifies the image file.
    XSrc—X-coordinate of the desired portion of the image data generated by the image server, in pixels.
    YSrc—Y-coordinate of the desired portion of the image data generated by the image server, in pixels.
    cxSrc—Width of the desired portion of the image data generated by the image server, in pixels.
    cySrc—Height of the desired portion of the image data generated by the image server, in pixels.
    lpBandBuffer—Pointer to a buffer in which the image server is to place the requested portion of the generated image data.
    lpBandHeader—Pointer to a data structure which specifies the format of the image data to be stored in lpBandBuffer.
Returns:
    TRUE—Function was successful.
    ISE_PROCERROR—Processing error encountered by the image server.
    ISE_NOTCONFIGURED—No processing operations have been performed. No calls have been made to the function ConfigureImage().
    ISE_NOTREGISTERED—ihImageHandle does not map to a currently registered image file.
UnlockImage
Function:
    Removes the file lock on lpszImageFileName if the file is currently locked by the image server. In doing so, the image server will make a temporary copy of the image file.
Parameters:
    lpszImageFileName—File name of the image file to be unlocked.
Returns:
    TRUE—Function was successful. lpszImageFileName is unlocked.
    ISE_OUTOFSPACE—Could not make a copy of the image file in order to unlock lpszImageFileName. The image file remains locked by the image server.
    ISE_NOTUNLOCK—Could not unlock lpszImageFileName. This typically indicates that the file was not locked by the image server.

The following fragment of pseudo-code illustrates how the above calls might appear in a typical document-handling application:

```
    :
    :
/* is JPEG supported? */
dwImageFormat <— JPEG image format
QueryFormatSupport( dwImageFormat, lpFormatData )
if( return value == ISE_FORMAT_NOTSUPPORTED )
    exit
/* register the image file */
lpszImageFileName <— document file name
lpJobData <— user specified, printer options
dwImageFormat <— JPEG image format
lpImageData <— NULL
lpImageDataHeader <— NULL
dwOptions <— IS_COPYNOW /* do not lock the file */
RegisterImage ( lpszImageFileName, lpJobdata, dwImageFormat,
    lpImageHandle, lpImageData, lpImageDataHeader, dwOptions )
if( return value != TRUE )
    exit
/*
send handle (lpImageHandle) to the printer driver,
along with print parameters
*/
    :
    :
```

The following pseudo-code fragments illustrate how the image server utilities might appear in the printer driver software:

```
    :
    :
/* tell image server: about to start image processing */
ihImageHandle <— image handle received from user application)
OpenImage( ihImageHandle )
if ( return value == ISE_NOTREGISTERED )
    inform user application: invalid handle
    exit
/* perform image processing */
for all print parameters received from user application, do
    ipImageProcOptions <— print parameters
    ConfigureImage( inImageHandle, ipImageProcOptions )
    if( return value == ISE_FORMAT_NOTSUPPORTED )
    inform user applicaton: invalid print parameter(s)
    exit
continue
/* obtain image data of the processed image and send to printer */
XSrc <— X-coordinate of initial segment of the processed image
YSrc <— Y-coordinate of initial segment of the processed image
cxSrc <— width of image portion
cySrc <— height of image portion
lpBandHeader <— retrieve the processed image in GIF format
for all segments of the processed image data, do
    RetrieveImageBand( ihImageHandle, Xsrc, Ysrc,
        cxSrc, cySrc, lpBandBuffer, lpBandHeader )
    send segment pointed to by lpBandBuffer to the printer
    increment to the next segment of the processed image
    Xsrc <— X-coordinate of next segment
    Ysrc <— Y-coordinate of next segment
continue
    :
    :
CloseImage( ihImageHandle )
    :
    :
```

Figure 4:
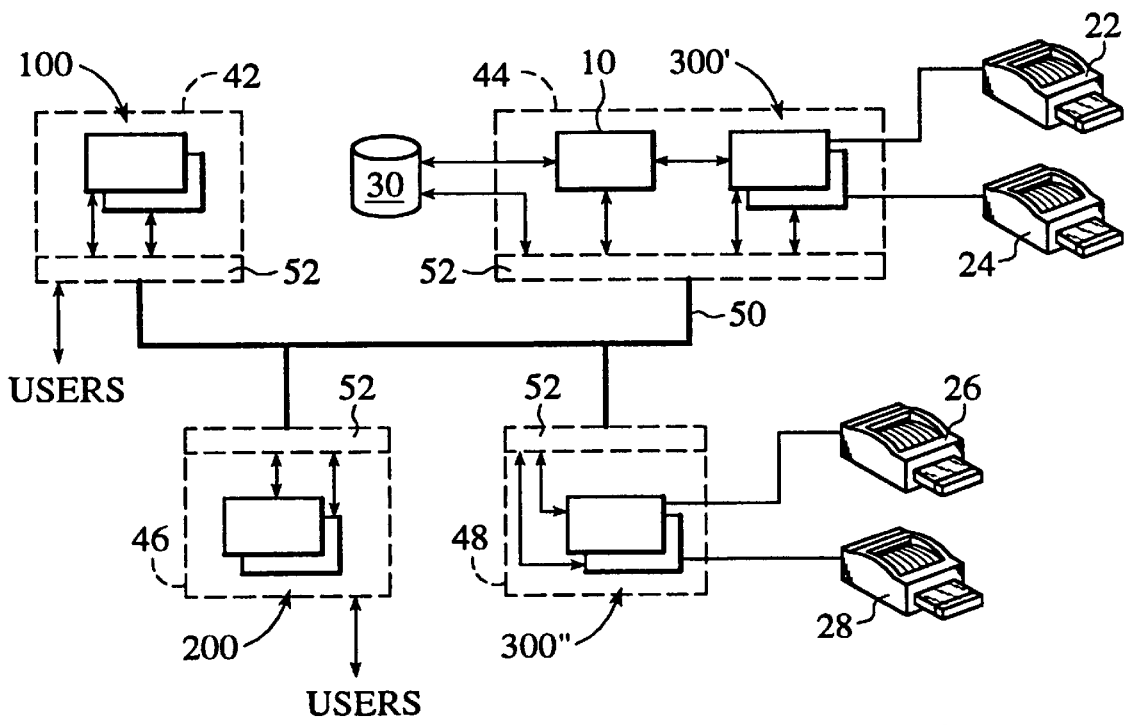
FIG. 4 is a system diagram of the present invention arranged in a networked configuration.

The discussion will now turn to an embodiment of the present invention depicted in FIG. 4. Whereas the components of the invention are shown in FIG. 1 as residing on one computer, the same components shown in FIG. 4 are distributed over two or more networked computers. The computers 42 through 48 are interconnected by a network 50. The network 50 may be an Ethernet backbone in a LAN (local area network) or may include the telephone network in a WAN (wide area network). More generally, the computers 42 through 48 may be interconnected by some combination of LAN and WAN. The present invention can be practiced with any network configuration, and is not limited to any one architecture.

Each computer communicates over the network via its network interface 52. The interface 52 includes the hardware and server software needed to allow the particular computer to access another computer over the network. Recall that the applications 100, image server 10 and printer drivers 300 are separate processes, and that communication among these processes is accomplished by appropriate IPC calls. In a networked configuration, the IPC calls must be replaced with equivalent remote procedure calls (RPC) so that these processes can operate over the network. While the implementation of RPC generally depends upon the capabilities of the particular OS, it nevertheless is within the scope of a person of ordinary skill in the programming arts.

FIG. 4 shows a computer which functions as a disk server 44. Resident on the disk server is an image server 10 of the present invention. Printer drivers 300' are also loaded on the disk server 44 to drive printers 22, 24. Another computer 48 serves primarily as a printer server for printers 26, 28. User applications 100 residing on computer 42 can access files on the disk 30, via server software running on the disk server 44. User applications 200 running on computer 46 operate in a similar manner.

Although the components of the present invention are distributed, the operation of the invention remains the same. Thus, for example, a RegisterImage() call can be initiated from the application 100 on computer 42, sent across the network to computer 44 and processed by the image server 10. The image server 10 creates a handle and returns the handle to the application 100. The application then communicates over the network to initiate a print job with printer driver 300' on computer 44. From there, the printer driver 300' and image server 10, operating within the same computer 44, interact in the manner described above to produce the final printer image. Alternatively, the application 100 may initiate a print job with printer driver 300" on computer 48. Like the printer driver 300'on computer 44, the printer driver 300" on computer 48 negotiates image processing requests with the image server 10. However, unlike the printer driver 300' on computer 44, the printer driver 300" must negotiate the image server calls over the network.

We claim:

1. A method of processing images, comprising the steps of:
    (a) obtaining a digitized image;
    (b) specifying transformation parameters indicating a desired appearance of said digitized image;
    (c) registering said digitized image with an image server;
    (d) in response to said step of registering, receiving an image identifier handle from said image server;
    (e) sending image processing requests to said image server to produce image data of said digitized image in accordance with said transformation parameters, including sending said image identifier to said image server to identify said digitized image, whereby said desired appearance of said digitized image is produced; and
    (f) retrieving said image data from said image server.

2. The method of claim 1 further including loading a user application and said image server as concurrently and independently executing programs on a computer, said user application performing said substeps (a) through (f).

3. The method of claim 1 further including loading first and second user applications on a computer, said first user application performing said substeps (a) through (e) for a first digitized image, said second user application performing said substeps (a) through (e) for a second digitized image.

4. The method of claim 1 further including loading a user application on a first computer and loading said image server on a second computer, said user application performing said substeps (a) through (f).

5. The method of claim 1 wherein said step of registering includes transmitting to said image server an image reference, said image reference indicating the location of said image.

6. The method of claim 5 wherein said image reference is a file name if said image is disk-resident, or a beginning location in a random access memory (RAM) if said image is resident in said RAM.

7. The method of claim 1 further including:

loading a user application, said image server and a printer driver, each as a concurrently and independently executing program unit, said printer driver being configured to communicate with a first type of printer;

said user application performing substeps (a) through (d);

transmitting said image handle and said transformation parameters from said user application to said printer driver subsequent to performing said substep (d);

said printer driver performing said substeps (e) and (f); and transmitting said image data from said printer driver to said first type of printer.

8. The method of claim 7 further including a step of loading a second printer driver on said computer as a concurrently and independently executing program, said second printer driver being configured to communicate with a second type of printer.

9. The method of claim 7 further including loading a user application on a first computer and loading said image server and said printer driver on a second computer.

10. The method of claim 7 further including loading and executing said image server of a first computer and loading and executing said printer driver on a second computer.

11. A system for printing documents from a document processing application, said system including:

a first memory store containing a plurality of documents, said documents having document locators which specify the location of said documents in said first memory store;

an image processing server; and a printer driver;

said image processing server being an independently executing program unit;

said image processing server having means for generating a document identifier upon receipt of a document locator, said document identifier identifying the document specified by said document locator;

means for initiating a print job, including means for communicating one of said document locators to said image processing server, means for obtaining a corresponding document identifier from said image processing server and means for communicating job parameters to said printer driver, said job parameters including print parameters and said corresponding document identifier;

said printer driver having means for manipulating image data of the document identified by said corresponding document identifier, including means for sending image processing requests to said image processing server in accordance with said print parameters;

said printer driver having means for obtaining said manipulated image data from said image processing server, and further having means for transmitting said manipulated image data to a printer of a first kind.

12. The system of claim 11 wherein said document processing application, said image processing server and said printer driver are resident in a single computer.

13. The system of claim 11 further including a first computer for executing said document processing application and a second computer for executing both said image processing server and said printer driver, said first and second computers having a communication channel therebetween.

14. The system for claim 11 further including a first computer for executing said image processing server and a second computer for executing said printer driver, said first and second computers having a communication channel therebetween.

15. The system of claim 11 further including a second printer driver, a second printer of a second kind and a communication channel therebetween, said means for communicating job parameters including means for selecting between said printer driver and said second printer driver.

16. A method of printing documents in a computer system, comprising the steps of:

loading into random access memory (RAM) of said computer system a first user application;

loading into said RAM a document server process and executing said document server process concurrently with and independently of said first user application;

loading into said RAM a printer driver process and executing said printer driver process concurrently with and independently of said first user application and said document server process;

with said first user application, selecting a first document to be printed and specifying first print parameters indicating a desired appearance of said first document, said first document having a first document identifier used to access said first document;

from said first user application, communicating said first document identifier to said document server process, followed by a substep of communicating a first document handle from said document server process to said first user application;

from said first user application, issuing a print job including communicating said first document handle and said first print parameters to said printer driver process;

from said printer driver process and using said first document handle, communicating image processing requests to said document server process in accordance with said print parameters, so that image data of said desired appearance of said first document is generated by said document server process;

from said document server process, communicating said image data to said printer driver process; and from said printer driver process, communicating said image data to one of a printer and a storage device for subsequent printing.

17. The method of claim 16 further including the steps of:

loading into said RAM a second user application;

with said second user application, selecting a second document to be printed and specifying second print parameters, said second document having a second document identifier;

from said second user application, communicating said second document identifier to said document server process, followed by a step of communicating a second document handle from said document server process to said second user application; and from said second user application, communicating said second document handle and said second print parameters to said printer driver process.

18. The method of claim 16 further including loading into said RAM a second printer driver process, said first user application selectively communicating said first document handle and said first print parameters to one of said printer driver and said second printer driver.

19. The method of claim 16 further including locking said first document so that said first document is accessible only by said document server process, said substep of locking being performed in response to receipt of said first document identifier by said document server process.

20. The method of claim 19 further including a step of accessing said first document subsequent to said step of issuing a print job, said step of accessing including requesting said document server process to unlock said first document, creating a temporary copy of said first document and unlocking said first document, whereby said first user application has access to said first document and said document server process accesses said temporary copy.

* * * * *